Sept. 9, 1952 H. K. CYMARA 2,609,651
MACHINE FOR GATHERING, TURNING, AND WINDROWING HAY OR THE LIKE
Filed Jan. 10, 1949 2 SHEETS—SHEET 1
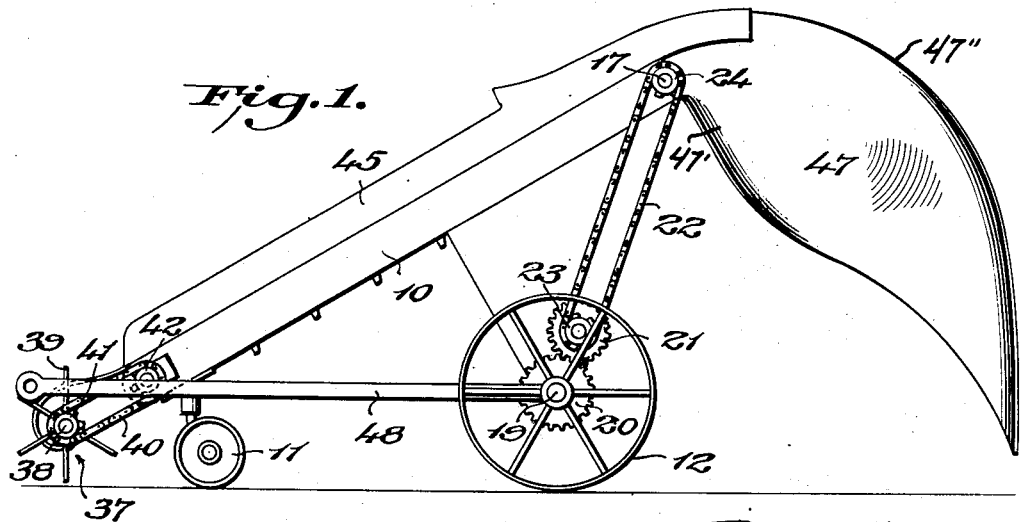
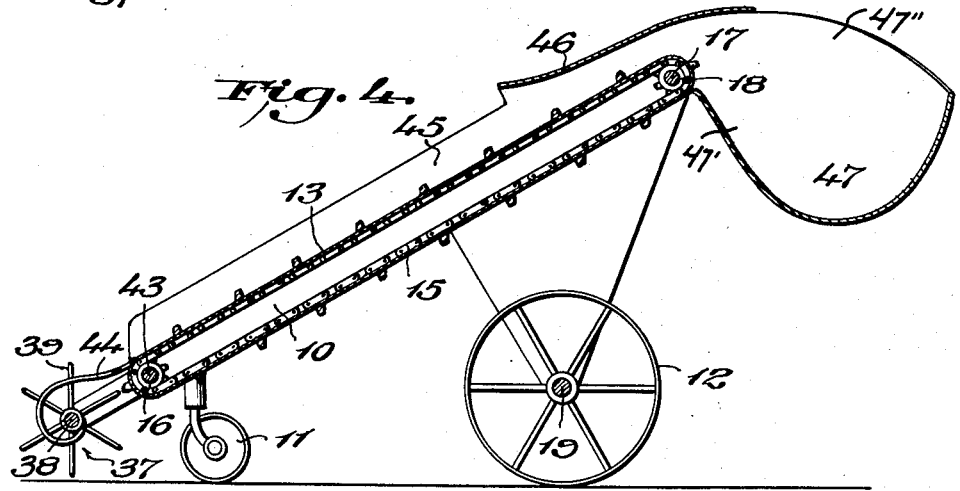
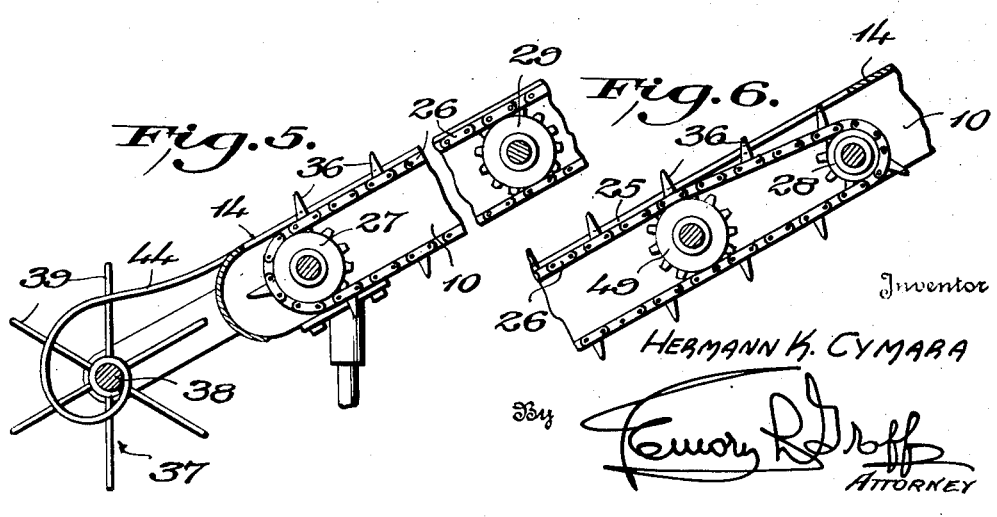

Sept. 9, 1952            H. K. CYMARA            2,609,651
MACHINE FOR GATHERING, TURNING, AND WINDROWING HAY OR THE LIKE
Filed Jan. 10, 1949            2 SHEETS—SHEET 2
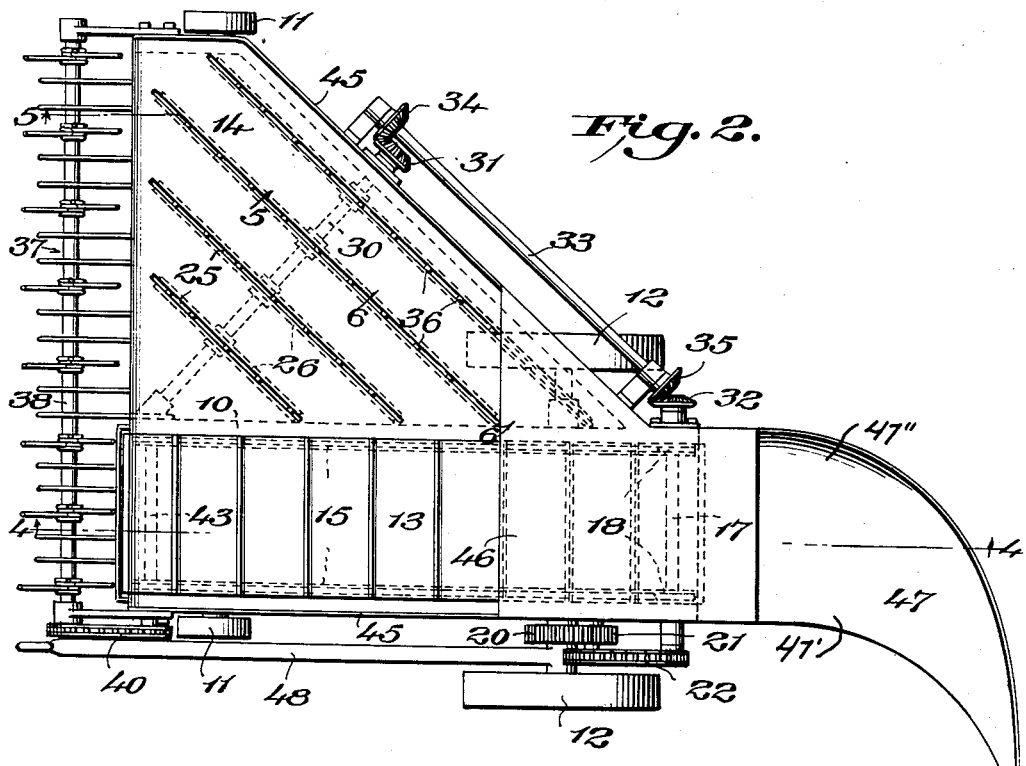
Fig. 2.
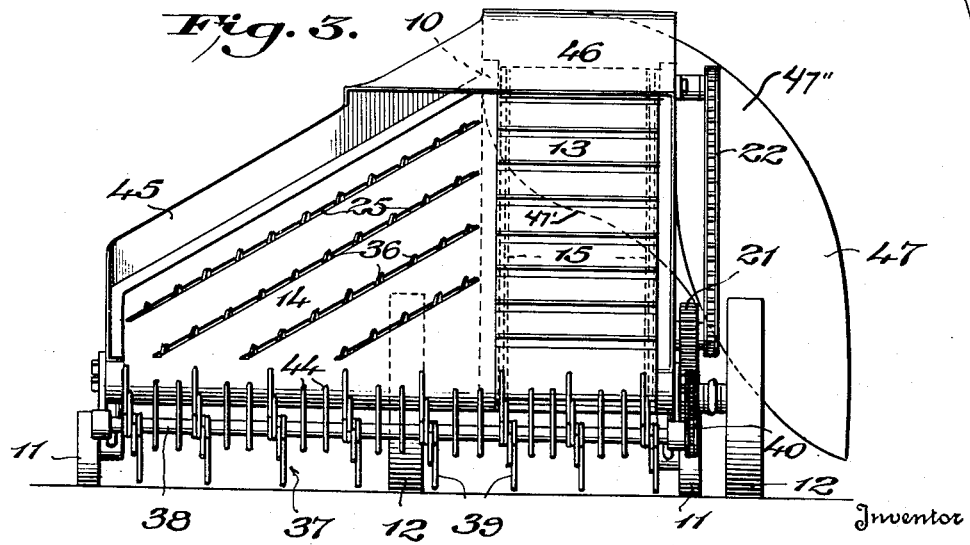
Fig. 3.
Inventor
HERMANN K. CYMARA
ATTORNEY Patented Sept. 9, 1952

2,609,651

UNITED STATES PATENT OFFICE 2,609,651

MACHINE FOR GATHERING, TURNING, AND WINDROWING HAY OR THE LIKE

Hermann Karl Cymara, Willseyville, N. Y.

Application January 10, 1949, Serial No. 70,047

2 Claims. (Cl. 56—370)

This invention relates to a machine for gathering, turning and windrowing mown hay and other grasses and plants, and has for its general object to provide a machine for these purposes which is of simple, practical construction and highly efficient in operation.

More particularly, a special and important object of the invention is to provide a machine for the purposes stated which is so designed that as it is advanced it gathers hay or the like over an area of considerable width, brings the gathered hay or the like laterally together into a compact mass of narrow width and shallow depth, turns the compact mass so that what was its underside becomes its upper side, and delivers the compact, turned mass as a windrow at one side of the machine.

According to the invention, the machine comprises upwardly and rearwardly inclined conveyors, a rotary rake located in advance of said conveyors to gather hay or the like and deliver it to said conveyors, and a chute located at the rear of said conveyors to receive hay or the like from the latter and deliver it to one side of the machine. In connection with such a machine, other objects of the invention are: to provide novel means to insure that the hay or the like will be gathered and, without being turned, will be delivered from the rotary rake to the conveyors; to provide conveyors which are operable to bring the unturned hay or the like into a compact mass of narrow width; to provide means for cooperation with said conveyors to cause the narrow width mass of hay or the like to be compressed to shallow depth, and to provide a chute which, generally speaking, is of helical form whereby it causes hay or the like gravitating down the same to be turned end for end and therefore bottom side upward so that what was the underside of the hay or the like becomes the upper side thereof as it is delivered in a windrow at one side of the machine.

With the foregoing and other objects in view, which will become more fully apparent as the nature of the invention is better understood, the same consists in a machine for the purposes stated which embodies the novel features of construction, combination and arrangement of parts as are illustrated by way of example in the accompanying drawings and as will be hereinafter more fully described and claimed.

In the accompanying drawings, wherein like characters of reference denote corresponding parts in the different views:

Figure 1 is a side elevation of a machine constructed in accordance with the invention;

Figure 2 is a top plan view of the machine;

Figure 3 is a front elevation of the machine;

Figure 4 is a longitudinal section through the machine on the line 4—4 of Fig. 2;

Figure 5 is a detail section on the line 5—5 of Fig. 2; and

Figure 6 is a detail section on the line 6—6 of Fig. 2.

Referring to the drawings in detail, it will be observed that the present machine comprises a suitable frame, designated generally as 10, and that this frame is supported at a suitable upward and rearward inclination by a front pair of wheels 11 and a rear pair of wheels 12. It will further be observed that the frame 10 is of generally triangular shape as viewed in plan; that it is considerably wider at its front end than at its rear end; that its front end is disposed at right angles to the direction of advance of the machine; that one side portion thereof is disposed parallel to the direction of advance of the machine, and that the other side portion thereof converges rearwardly toward said first mentioned side portion.

In the first mentioned side portion of the frame 10 and extending from front to rear thereof, preferably at the same upward and rearward inclination as said frame 10, is a belt conveyor 13 of any suitable construction and width, while covering the second mentioned side portion of said frame is a skidway 14 which may be formed from any suitable material such, for example, as sheet metal, and which is disposed in substantially the same plane as the upper reach of said belt conveyor 13.

While the belt conveyor 13 may be mounted and may be driven in any suitable manner such that its upper reach moves rearwardly as the machine is advanced, one simple, practical manner of mounting and driving said belt conveyor in this manner is to provide the same with sprocket chains 15; to provide adjacent to the front end of the frame 10 idler sprocket wheels 16 over which said sprocket chains travel; to provide adjacent to the rear end of said frame 10 a shaft 17 having fixed thereon sprocket wheels 18 over which said sprocket chains extend, and to suitably drive said shaft 17 and its sprocket wheels 18 from the axle 19 of the rear pair of machine supporting wheels 12. In this latter connection and as illustrated by way of example in the drawings, a suitable driving connection between the axle 19 and the shaft 17 may comprise a spur gear 20 fixed to said axle 19 and meshing with a spur gear 21 mounted on the frame 10, and a sprocket chain 22 connecting sprocket wheels 23 and 24 fixed with respect to said spur gear 21 and to the shaft 17, respectively.

Formed in the skidway 14 are a plurality of spaced apart, parallel slots 25 which are inclined rearwardly and laterally toward the belt conveyor 13 and which extend from points adjacent to the front end of said skidway to points adjacent to the inner side of said belt conveyor.

Beneath the skidway 14 are a plurality of endless sprocket chains 26 which are individual, respectively, to the slots 25 and each of which is substantially co-extensive in length with and underlies its related slot.

Suitably mounted beneath the skidway 14 adjacent to the front and the rear ends of each of the slots 25 are idler sprocket wheels 27 and 28, respectively, over which the sprocket chains 26 travel, while individual to and engaged with said sprocket chains are driving sprocket wheels 29 all of which are fixed to a common drive shaft 30.

The drive shaft 30 extends beneath the skidway 14 at right angles to the sprocket chains 26 and has its inner end extending beyond the inner side of the frame 10 and provided with a bevel pinion 31. The inner end of the shaft 17 also extends beyond the inner side of the frame 10 and at its inner end is provided with a bevel pinion 32. Extending between the inner ends of said shafts 17 and 30 is another shaft 33 which is provided with bevel pinions 34 and 35 which mesh with the bevel pinions 31 and 32, respectively. Thus, all of the sprocket chains 26 are driven in harmony with each other and with the belt conveyor 13. Moreover, the arrangement of the driving gearing for said sprocket chains 26 is such, as shown, that the upper reaches of said sprocket chains travel rearwardly.

At points suitably spaced apart along their lengths, the sprocket chains 26 have fingers 36 projecting therefrom. Moreover, the upper reaches of said sprocket chains 26 are disposed closely adjacent to the underface of the skidway 14 so that the fingers 36 project from said upper reaches through the slots 25 suitable distances above the upper face of said skidway 14. Thus, as the sprocket chains 26 are driven and their upper reaches travel rearwardly, the fingers 36 are effective to slide rearwardly over the skidway 14 hay or other material which may be delivered to said skidway. Moreover, since the sprocket chains 26 are inclined rearwardly toward the belt conveyor 13, the fingers 36 are effective to slide hay or the like delivered to the skidway 14 not only rearwardly over the latter, but also laterally thereover toward the belt conveyor 13.

Suitably mounted in advance of the front ends of the belt conveyor 13 and the skidway 14 is a rotary rake 37 which is composed of a shaft 38 having tines 39 in the form of yieldable spring fingers radiating therefrom. By means of a sprocket chain 40 connecting a sprocket wheel 41 on the shaft 38 with a sprocket wheel 42 on a shaft 43 which carries the sprocket wheels 16, or in any other suitable manner, said rake 37 is rotated, as the machine advances, in a direction counter to the direction of rotation of the machine supporting wheels 11 and 12. Thus, said rake is effective, as the machine advances, to pick up mown hay or the like and to deliver it to the front or lower ends of the belt conveyor 13 and the skidway 14. In this connection and to assist the rake 37 in performing its stated function, bridge bars or fingers 44 are provided to extend from the shaft 38 to the front end of the skidway 14 and to points adjacent to the front end of the belt conveyor 14 for the purpose of wiping hay or the like from the tines 39 as the latter approach and move downwardly from their vertical positions above the shaft 38 and for supporting the hay or the like while it is being urged rearwardly by the tines 39 across the space between the rake 37 and the said front ends of said skidway and said belt conveyor. It will thus be apparent that as the machine advances, the tines 39 engage beneath the hay or the like and elevate it without turning it and that the bridge bars 34 cooperate with said tines to insure delivery of the hay or the like, still unturned, to the front ends of the belt conveyor and the skidway.

Rising from the sides of the frame 10 are plates 45 which are effective to prevent hay or the like from sliding laterally from the belt conveyor 13 and from the skidway 14. Moreover, a top plate or hood 46 overlies and is suitably spaced above the upper portion of the belt conveyor 13 thereby forming a rearwardly convergent throat for the purpose of compressing hay or the like being conveyed upwardly by said belt conveyor by limiting the thickness of material passing therethrough.

At the rear end of the machine is a chute 47 which has a bottom 47' forming a material supporting portion and a side 47" forming a guiding portion which may be formed from sheet metal or any other suitable material and which has its front end disposed directly behind and slightly below the rear end of the belt conveyor 13 so as to receive hay or the like delivered from the latter. Said chute 47 is inclined downwardly and rearwardly and also laterally outward from its front end so that hay or the like gravitates down the same and is delivered from its lower end in the form of a windrow at one side of the machine. Moreover, said chute is of helical form and the outlet thereof is near the ground so that as the hay or the like is discharged from the outlet, the bottom side thereof relative to its position on the belt conveyor, faces rearwardly. Consequently, as the machine moves forwardly, the hay is deposited in the windrow and has a position the reverse of the position it occupied in the field before it was gathered. In other words, what was the more or less damp underside of the hay or the like before it was gathered becomes the upper part thereof in the windrow. Substantially uniform drying of the hay or the like thereby is insured. Moreover, avoidance of turning of the hay or the like by the rake 37 or by any means other than by the chute 47 serves to avoid undesirable agitation of the hay or the like and consequent stripping of leaves from the same.

As illustrated in the drawings, a tongue 48 extends forwardly from the axle 19 whereby a tractor or draft animals may be hitched to the machine for propelling the same. The machine may, however, be self-propelled if desired.

By reference to Figure 6 of the drawings, it will be observed that suitably in advance of the rear idler sprocket wheels 28 are other idler sprocket wheels 49 which cooperate with the front idler sprocket wheels 27 and the driving sprocket wheels 29 to support the upper reaches of the sprocket chains 26 from their front ends to points near their rear ends substantially against the under face of the skidway 14. Thus, between the sprocket wheels 27 and 49, the fingers 36 are caused to project above the skidway 14 to accomplish their purpose of moving hay or the like rearwardly over said skidway. However, it will also be observed by reference to Figure 6 that the tops of the sprocket wheels 28 are disposed below the skidway 14 by amounts substantially equal to the lengths of the fingers 36 so that between the sprocket wheels 49 and 28 the upper reaches of the sprocket chains 26 are inclined rearwardly and downwardly relative to the skidway 14. It will thus be apparent that as the rear portions of the upper reaches of the sprocket chains 26 approach the sprocket wheels 28, the fingers 36 will be caused gradually to recede below the skidway 14 while they remain substantially upright. Said fingers thus will have little or no tendency to wipe the hay or the like downwardly into the slots 25.

Summarizing, it will be apparent that the present machine is designed to gather hay or the like over a relatively wide area; that the rake 37 in conjunction with the bridge bars 44 is effective to elevate the hay or the like and, without turning it, to deliver it to the lower, front ends of the belt conveyor 13 and the skidway 14; that the sprocket chains 25 are effective to move hay or the like not only upwardly and rearwardly over the skidway 14, but also laterally thereacross toward the belt conveyor 13 whereby the hay or the like is brought together into a compact mass of narrow width; that the plate 46 causes the narrow width mass of hay or the like to be compressed as it approaches the rear end of the belt conveyor 13 and just prior to its delivery to the upper, front end of the chute 47, and that said chute 47 is effective to turn the narrow width, compressed mass of hay or the like end for end and bottom side upward and to deliver it so turned as a windrow at one side of the machine at a point substantially horizontally aligned with said rake, that is, close to the stubble and in the general horizontal plane of the rake, though of course further back and laterally spaced from the vertical alignment of the conveyor.

From the foregoing description considered in connection with the accompanying drawings, it is believed that the construction and operation of the present machine will be clearly understood and its advantages appreciated. It is desired to point out, however, that while only a single specific structural embodiment of said machine has been illustrated and described, the same is readily capable of specifically different structural embodiments within the spirit and scope of the invention as defined in the appended claims.

I claim:

1. A chute for use with a raking and elevating device including a rotary rake and an endless elevating conveyor extending from a point adjacent said rake to an elevated position; said chute comprising a top hood portion and a material supporting and guiding portion, said material supporting and guiding portion extending away from and downwardly from said top hood portion to a point substantially horizontally alined with said rake, said supporting and guiding portion having adjacent said top portion a bottom and a side, said bottom being gradually diminished in width and said side gradually extended over the bottom to a point where the remaining chute constitutes a substantially vertically extending portion of the top only, whereby material sliding down said chute is gradually turned and delivered at the lower end thereof in an inverted condition.

2. A chute for use with a raking and elevating device including a rotary rake and an endless elevating conveyor extending from a point adjacent said rake to an elevated position; said chute comprising a top hood portion and a material supporting and guiding portion, said material supporting and guiding portion extending away from and downwardly from said top hood portion to a point laterally spaced from the vertical alignment of the conveyor and substantially horizontally alined with said rake; said supporting and guiding portion having adjacent said top portion a bottom and a side, said bottom being gradually diminished in width and said side gradually extended over the bottom to a point where the remaining chute constitutes a substantially vertically extending portion of the top only, whereby material sliding down said chute is gradually turned and delivered at the lower end thereof in an inverted condition.

HERMANN KARL CYMARA.

REFERENCES CITED

The following references are of record in the file of this patent:

UNITED STATES PATENTS

| Number | Name | Date |
|---|---|---|
| 749,512 | Anderson | Jan. 12, 1904 |
| 1,406,946 | Eiler | Feb. 14, 1922 |
| 2,391,763 | Anderson | Dec. 25, 1945 |